S. L. C. COLEMAN.
VEHICLE SUSPENSION.
APPLICATION FILED NOV. 22, 1917.
1,297,325.
Patented Mar. 18, 1919
3 SHEETS—SHEET 1.
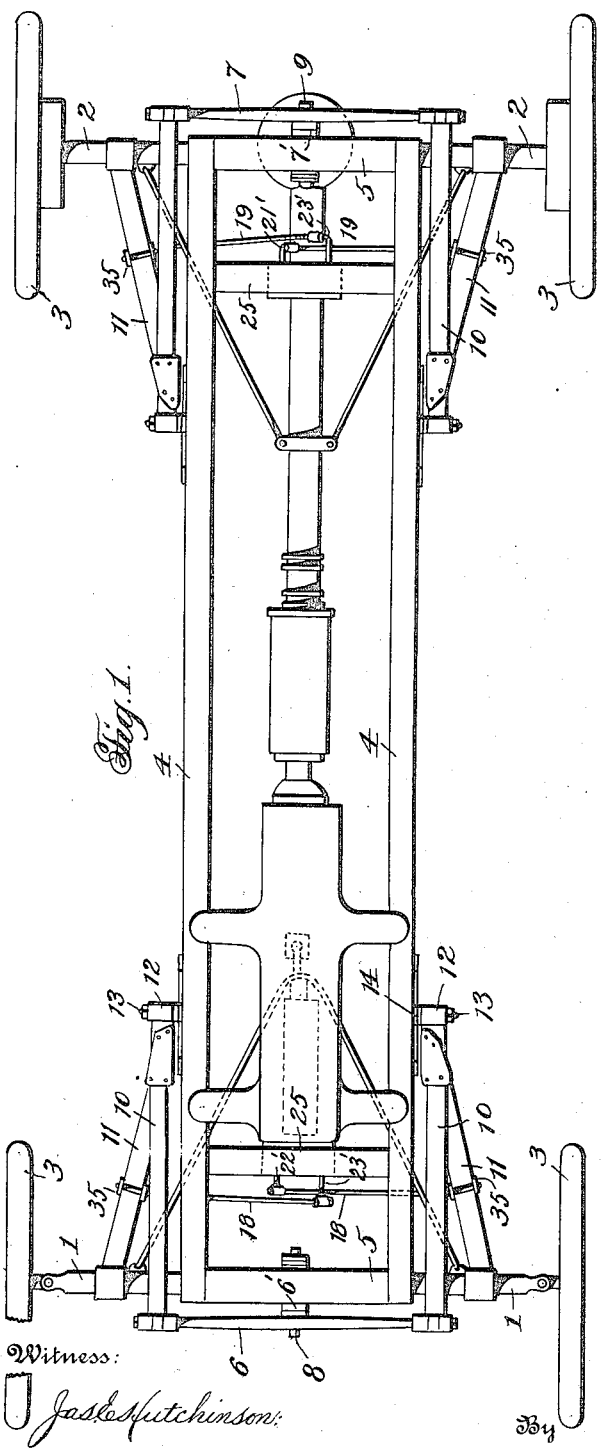
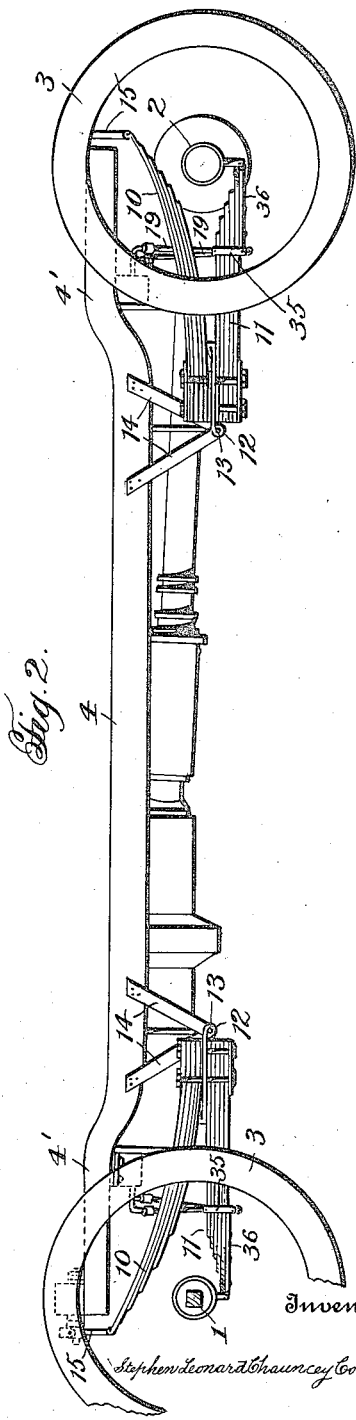

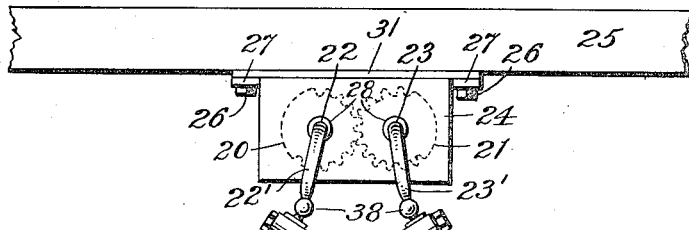
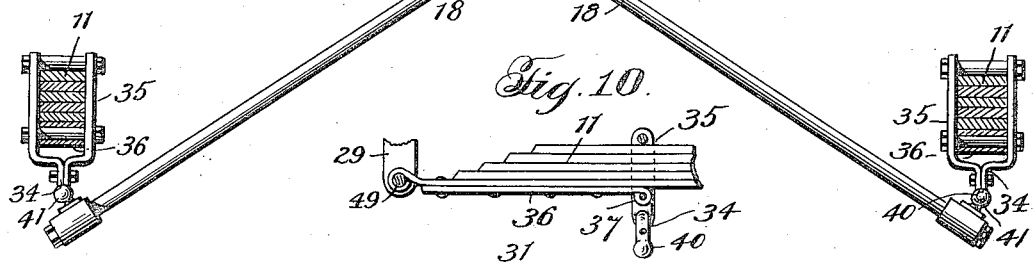
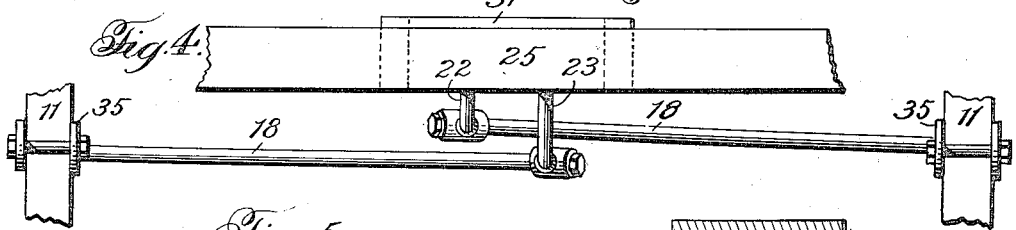
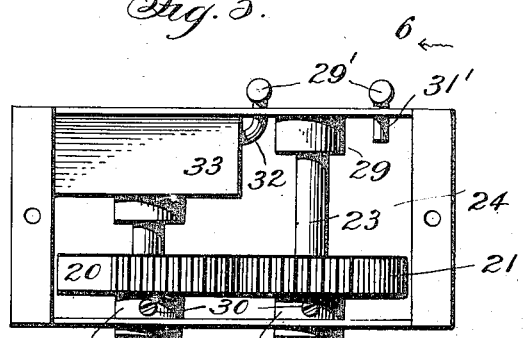
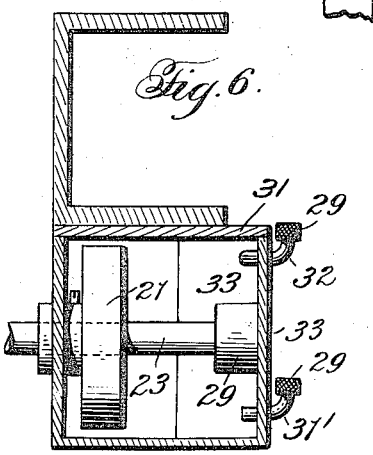
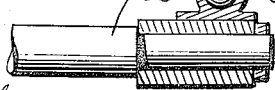

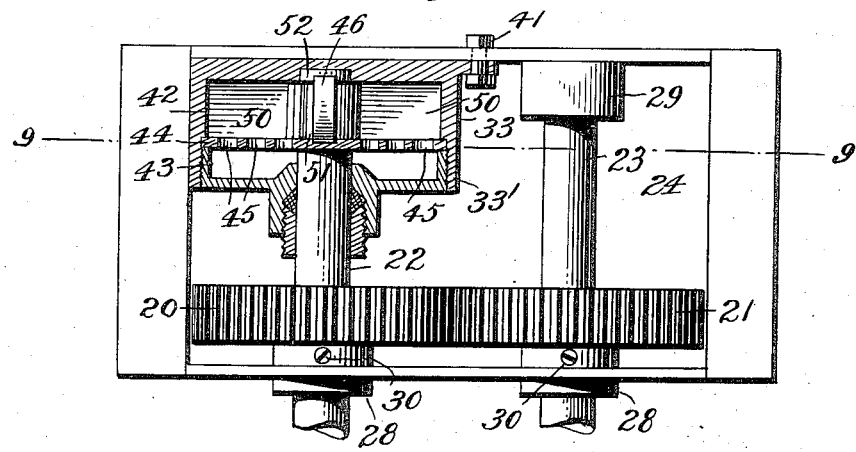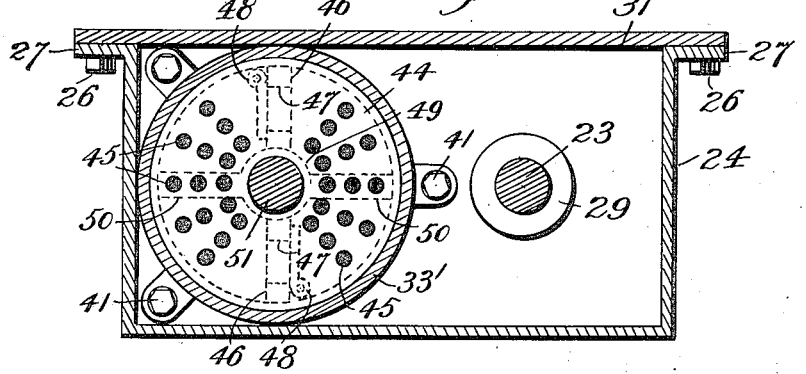

UNITED STATES PATENT OFFICE.

STEPHEN LEONARD CHAUNCEY COLEMAN, OF FREDERICTON, NEW BRUNSWICK, CANADA, ASSIGNOR OF FORTY-NINE ONE-HUNDREDTHS TO CHARLES W. WHELPLEY, OF FREDERICTON, NEW BRUNSWICK, CANADA.

VEHICLE SUSPENSION.

1,297,325.   Specification of Letters Patent.   Patented Mar. 18, 1919.

Application filed November 22, 1917. Serial No. 203,457.

*To all whom it may concern:*

Be it known that I, STEPHEN LEONARD CHAUNCEY COLEMAN, a subject of the King of Great Britain, residing at Fredericton, in the county of York, Province of New Brunswick, and Dominion of Canada, have invented certain new and useful Improvements in Vehicle Suspensions, of which the following is a specification, reference being had therein to the accompanying drawing.

This invention relates to improvements in spring suspensions for vehicles particularly motor vehicles.

The object of the invention is to provide an improved spring suspension of simple relatively light construction that will effectually absorb shocks from the running gear, and that will prevent excessive vibration and lateral swinging or rolling of the vehicle body.

Another object of the invention is to provide an improved spring suspension of simple construction capable of effectually absorbing and cushioning small or light shocks as well as more severe or heavy shocks without the use of under load or coil springs or overload springs or bumpers.

A further object of the invention is to provide for the distribution of one wheel shocks and the stress of unevenly distributed loads to all of the load springs, so that several load springs work together to cushion and absorb the shocks whether the shock is received through one wheel or both ends of the axle, and so that the springs are automatically adjusted and coact with each other to afford equilibrium of support for the body under conditions of unbalanced or unequal distribution of load to the body.

The invention comprehends the use of equalizer bars connected with the springs, and to which the vehicle frame is pivoted. An important novel characteristic of the invention resides in the provision in combination with equalizer bar and spring construction of stabilizer mechanism that coöperates with the equalizer bar and spring construction to produce the desired results, the stabilizer mechanism serving to maintain a certain relation of the parts for the efficient functioning of the equalizer bars and springs.

Another important novel feature of the invention also lies in the special connection of the vibration check device with the running gear through the stabilizer mechanism, whereby a more simple compact construction is afforded.

The invention consists in the features of constructions, combination of elements, and arrangement of parts, which will be exemplified in the construction hereinafter described and illustrated in the accompanying drawings, and the scope of the invention will be indicated in the appended claims.

In the drawings:

Figure 1 is a top plan view of a portion of a vehicle equipped with a spring suspension constructed in accordance with the present invention.

Fig. 2 is a side elevation.

Fig. 3 is a detail front elevation on enlarged scale of the stabilizer mechanism and its connection with the springs and frame located at one end of the frame.

Fig. 4 is a top plan view of the construction illustrated in Fig. 3.

Fig. 5 is a detail top plan view, on an enlarged scale, of a part of the stabilized mechanism and the vibration check device connected therewith.

Fig. 6 is a detail transverse sectional view, on an enlarged scale, taken on the line 6—6 of Fig. 5.

Fig. 7 is a detail view, on an enlarged scale, of the connection for one of the struts of the stabilizer mechanism with the equalizer device.

Fig. 8 is a detail top plan view, on an enlarged scale of part of the stabilizer mechanism, the vibration check being shown in horizontal section.

Fig. 9 is a sectional view taken on the line 9—9 Fig. 8.

Fig. 10 is a detail view, on an enlarged scale, of one of the levers and one of the clamps directly associated with the lower leaf spring members.

Referring to a detail description of the drawings, wherein like reference characters designate corresponding parts throughout the several views, 1 designates the front axle, 2 the rear axle housing, 3 the wheels, 4 the side bars and 5 end bars of the vehicle body supporting frame, the side bars in this instance having raised end portions 4' as shown.

Pivotally connected with the frame or chassis are front and rear transverse equalizer members or bars 6 and 7, said bars being provided with bearings 6'—7' engaging short shafts or pivots 8 and 9 projecting horizontally from the end bars 5. At each end of the frame and at opposite sides thereof is arranged a spring consisting of a pair of leaf springs 10 and 11 that have their butt ends clamped together and pivotally connected to the side bars 4 of the frame, and their outer thin ends or tips pivotally connected respectively to the outer portion of one of the equalizer bars and one of the axles, the springs at their butt ends being provided with eyes 12 engaging laterally projecting pivots 13 carried by depending hangers 14 that are secured to the side bars 4 of the frame. The outer ends of the upper spring members 10 are connected with the equalizer bars by double looped shackles 15 of well known construction.

The upper member 10 of the springs extend parallel with the side bars 4 of the frame while the lower members 11 are disposed at an angle to the side bars, the two members 10—11 of the springs diverging in two directions. The pivotal connection of the butt ends of the springs to the side bars of the frame permits the springs to act in series with each other, each member of the spring deflecting part of the total deflection of the spring as a whole. Under deflection the two members of the spring will come together for a distance of several inches, shortening the flexible part of each spring member, increasing the strength of the spring and thus avoiding danger of breakage. This special construction provides for cushioning and absorbing relatively small or light shocks as well as extremely heavy or severe shocks, without the use of auxiliary under loads or coiled springs and of overload springs or bumpers. The upper member 10 of the springs has considerable camber while the lower member 11 is only cambered to a relatively slight extent, and one spring member is longer than the other so that the periods of oscillation of the respective spring members will be different, and the members of the springs will act to damp out the vibrations of each other.

The special diverging arrangement of the spring members adds greatly to their resistance to torsional strain and in this way aids materially in preventing rolling of the body of the vehicle. The relatively broad construction of the lower spring member having only relatively slight camber, said spring member being substantially flat under normal load, is also instrumental in obtaining this result.

The equalizer members 6 and 7 serve to distribute shocks received through one wheel, and the stress of unevenly distributed loads to all of the springs. The action of the equalizer members is as follows: When one end of one of the axles is raised, the lower spring member 11 of the spring connected thereto is put under stress, bends a certain amount, and being free to turn rises and passes some of the extra stress onto the upper spring member 10, the latter in turn absorbing a part of the shock and passing the balance of the stress to the spring at the opposite side of the frame, the equalizer bar raising at one end and lowering at its other end and increasing the tension in the upper spring member 10 of the spring at the other side of the frame which upper spring member in turn acts upon the lower spring member. As is apparent the equalizer members act in a similar way when more weight is placed on one side of the vehicle body than on the other, the equalizer bars acting to distribute the weight throughout the several springs to provide an even support for the vehicle body.

The construction so far described is substantially the same as that described and claimed in my prior application filed September 13, 1916, Serial No. 119,934.

The present invention provides in combination with the equalizer bar and spring construction, stabilizer mechanism which coöperates therewith to prevent lateral shifting and rolling of the vehicle body and to maintain equilibrium of support for the body against unequal distribution of load. In the drawings is illustrated one form of stabilizer mechanism constructed and combined with the other elements of the spring suspension in accordance with the invention.

The particular construction of stabilizer mechanism shown comprises pairs of struts or brace members 18—19, and equalizer devices, one for each pair of struts or brace members. The pairs of struts 18—19 have flexible connections at their lower ends with the lower leaf spring members 11 of opposite springs at one end of the vehicle supporting frame, and the struts of each pair are connected at their upper ends with each other, and with the adjacent end of the vehicle supporting frame through one of the equalizer devices. Referring particularly to Figs. 3 and 4 of the drawings, each equalizer device comprises a pair of intermeshing gear segments 20 and 21 fixed upon parallel rotary shafts 22 and 23, the shafts at one end being provided with cranks 22'—23'. 24 designates a support and housing secured to one of the cross bars 25 of the vehicle supporting frame by bolts 26 that pass through securing flanges 27 on the ends of the housing. The parallel shafts 22 and 23 are supported for rotation by the housing with the intermeshing gear segments 20—21 located within the housing, and their cranks 22'—23' disposed at one side of the housing, the shafts extending into the housing through bearings 28 on one side wall thereof and the inner end of shaft 22 resting in a bearing 29 in the opposite side wall. The gear segments 20—21 are provided with integral collars 20'—21' and the collars are secured to the shafts by set screws 30, said gear segments being thus held in position upon the shafts and said shafts being maintained in position against movement longitudinally by the collars which at one side bear against the side wall of the housing. The housing 24 has a removable cover plate 31 at its top side held in place by the bolts 26. 31' designates an oil supply tube leading to the interior of the housing 24 and 32 is a similar filling tube leading to the liquid chamber of a vibration check device 33, hereinafter described, said filling tubes being provided with closure caps 29'.

The pairs of struts or brace members 18—19 at each end of the vehicle supporting frame have ball and socket connections respectively with the lower spring members 11 of opposite springs centrally of the ends of said spring members and from thence extend upwardly at an inclination across each other and at their upper ends have ball and socket connections respectively with the cranks 22'—23', the latter being disposed in vertical planes a sufficient distance apart, and said struts or brace members extending at a slight inclination longitudinally of the frame so that the brace members are free to operate without interference with each other. 34 designates levers projecting downwardly from the bottom faces of the lower leaf spring members, said levers 34 being secured to the lower leaf spring members by clamps 35, and the lower ends of the struts or brace members are connected with the lower ends of said levers 34, the lower ends of the levers being provided with spherical bearings 40 which loosely fit spherical sockets 41 on the lower ends of the struts. The clamps 35 are adjusted so that they do not bind the lower spring members tight enough to interfere with the proper functioning of the same, the clamps being held against movement longitudinally of the spring members by short plates 36 extending along the under face of the spring members and secured to the lower leaf thereof at the tips of said members, the plates at one end having loops 37 which are engaged with one of the bolts of the clamps 35. The ball and socket connections between the upper ends of the struts or brace members and the cranks 22'—23' consist of spherical bearings 38 at the outer ends of the cranks 22'—23' loosely engaging spherical sockets 39 on the upper ends of the struts or brace members.

As has been hereinbefore explained, the load carrying pivots 8 and 9 and the equalizer bars serve to distribute shocks received through one wheel, and the stress of unevenly distributed loads throughout the several springs. Tendency of the vehicle body supporting frame to revolve under shocks is also resisted by the outward diverging arrangement of the lower leaf spring members. This tendency of the vehicle frame to revolve about the load carrying pivots tends to force the spring pivots at one side of the vehicle frame downwardly and inwardly toward the center of the axle, and the spring pivots at the opposite side of the vehicle frame upwardly toward the center line of the axle. Owing to the special outwardly diverging arrangement of the lower leaf spring members 11 the stress would come longitudinally and crosswise these spring members and said members would offer an enormous resistance against such rolling movement providing the weight carrying pivots do not shift laterally from their normal position. Should the weight carrying pivots be permitted to shift laterally the resistance against rolling would depend solely upon the torsional resistance of the springs, the resistance offered under these conditions, being diminished to a considerable degree. The stabilizer mechanism acts to prevent the load carrying pivots from movement laterally thereby maintaining a relation of the parts whereby the special disposition or diverging arrangement of the lower leaf spring members and the equalizer bar and spring construction can function to best advantage to resist rolling of the vehicle supporting frame.

The universal ball and socket connections of the struts or brace members at their upper and lower ends with the springs and equalizer devices respectively provide for free pivotal movement of the struts so that the stabilizer mechanism is uneffected by longitudinal movement of the axles or the vertical movement of the vehicle supporting frame. During vertical movement of the vehicle supporting frame the equalizer cranks and gears rotate, the equalizer devices compensating for the lengthening and shortening of the distance between the parts during the rise and fall of the vehicle supporting frame, the struts or brace members not interfering with this movement but any tendency of the load carrying pivots to shift laterally from normal position is resisted by all of the struts, the struts at one side of the frame will be in compression and the struts at the opposite side in tension. If the frame is overbalanced at one side then the lower spring member of the spring at that side will have a tendency to descend and the load carrying pivot and the upper pivotal connection of the struts would also tend to move downwardly. This would create a thrust in the strut or brace member at that side against the lever at the under side of the lower spring member; and a pull in the opposite strut against the lever at the under side of the lower spring member of the spring at the other side of the frame, but when the lower spring member at one side descends and the lower spring at the other side consequently ascends they are torsioned and this will, through the levers connected to the lower leaf spring members throw one brace member toward its upper pivotal connection and the other brace member away from its upper pivotal connection thus creating forces in the braces just opposite to those first mentioned. Thus one set of forces offset the other assisting in preventing torsion in the lower spring members caused by the tendency of the body to roll.

In the case of one wheel shocks when one end of the axle is raised the lower spring members 11 of opposite springs are both torsioned and the braces or struts inclined in the same direction toward that end of the axle that is raised and this compensates for the differences in movement of the struts owing to the elevated position of one end of the axle, and prevents under these conditions lateral movement of the load carrying pivots.

The vibration check devices, which are designated as a whole by reference characters 33, are connected with the running gear through the stabilizer mechanism. These vibration check devices may be of any approved form, the particular construction shown being of the liquid type and comprising a casing 33', which is positioned within the housing 24 and secured to one wall thereof by screws 41. The casing 33' is divided into two chambers 42, 43, by a transverse partition 44 having small openings 45 forming passages connecting the chambers. Within the chamber 42 are radial abutments 46 which are provided with passages 47 extending through the same and controlled by check valves 48. Arranged to work in the chamber 42 is a rotary piston consisting of blades 50 secured to a shaft 51 supported at one end in a bearing 52. As will be understood the rotary piston is adapted to oscillate, and is retarded in its movement in one direction. The piston shaft 51 of the vibration check device is connected with the shaft 22 of the equalizer so that the vehicle body will be retarded in its vertical movement upon the rebound stroke of the springs.

It will be observed that the particular connection of the vibration check device with the running gear through the stabilizer mechanism affords a very simple compact construction, the check devices being located entirely out of the way within the housings 24, and the separate lever connections usually employed in connection with vibration check devices being entirely dispensed with.

It will be appreciated that the invention is susceptible of embodiment in other forms and that modifications and changes in the particular construction illustrated in the drawings, as will appeal to those skilled in the art, may be practised without departing from the spirit of the invention.

What I claim is:

1. A vehicle suspension including in combination with a frame and axles therefor a transversely disposed equalizing member pivotally connected intermediate its ends with the frame, and leaf springs at opposite sides of the frame each spring being connected with one of the axles and with said equalizing member at one side of its pivotal connection, and stabilizer mechanism including an equalizing device connected with the vehicle frame, and a pair of struts flexibly connected at their lower ends respectively with opposite springs, and flexibly connected at their upper ends with the equalizing device.

2. A vehicle suspension including in combination with a frame and axles therefor, a transversely disposed equalizing member pivotally connected intermediate its ends with the frame, leaf springs at opposite sides of the frame, each of said springs being connected with one of the axles and with said equalizing member at one side of its pivotal connection, an arm secured to each spring and extending downwardly below the same, and stabilizer mechanism including an equalizing device connected with the vehicle frame, and a pair of struts flexibly connected at their lower ends respectively with the arms of opposite springs, and flexibly connected at their upper ends with the equalizing device.

3. A vehicle suspension including in combination with a frame axles therefor, a transversely disposed equalizing member pivotally connected intermediate its ends with the frame, leaf springs at opposite sides of the frame, each of said springs being connected with one of the axles and with said equalizing member at one side of its pivotal connection, a lever secured to each spring and projecting beyond the same, and stabilizing mechanism including an equalizing device connected with the vehicle frame, and a pair of struts flexibly connected at their lower ends respectively with the levers of opposite springs, and flexibly connected at their upper ends with the equalizing device.

4. A vehicle suspension including in combination with a frame and axles therefor, a transversely disposed equalizing member pivotally connected intermediate its ends with the frame, springs at opposite sides of the frame, each spring comprising a pair of leaf springs having their butt ends secured together and pivotally connected to the frame, and their other ends connected respectively with one of the axles and with the equalizing member at one side of its pivotal connection with the frame, one of said leaf spring members of each spring having a lever secured thereto and projecting outwardly therefrom in the vertical plane thereof, and stabilizer mechanism including an equalizing device connected with the vehicle frame, and a pair of struts flexibly connected at their lower ends respectively with outer ends of the levers of opposite springs, and flexibly connected at their upper ends with the equalizing device.

5. A vehicle suspension including in combination with a frame and axles therefor, a transversely disposed equalizing member pivotally connected intermediate its ends with the frame, springs at opposite sides of the frame, each spring comprising a pair of leaf springs having their butt ends secured together and pivotally connected to the frame, and their other ends connected respectively with one of the axles and with the equalizing member at one side of its pivotal connection with the frame, the lower leaf spring members of each spring having portions clamped thereto and extending downwardly beyond the same, and stabilizer mechanism including an equalizing device connected with the vehicle frame, and a pair of struts flexibly connected at their lower ends respectively with said depending portions of opposite springs, and flexibly connected at their upper ends with the equalizing device.

6. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, and stabilizer mechanism including an equalizer device connected with the vehicle frame, and a pair of struts flexibly connected at their lower ends respectively with opposite springs, and flexibly connected at their upper ends with the equalizer device.

7. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, and stabilizer mechanism including a pair of intermeshing gears mounted for rotation upon the vehicle frame, cranks fixedly connected with said gears, and a pair of struts flexibly connected at their lower ends respectively with opposite springs, and flexibly connected at their upper ends with the said cranks.

8. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, and stabilizer mechanism including a housing secured to the vehicle frame, a pair of shafts mounted side by side for rotation in said housing, a pair of intermeshing gears within the housing fixedly secured to the respective shafts for rotation therewith, each of said shafts having a crank at one end thereof located outside of the housing, and a pair of struts flexibly connected at their lower ends respectively with opposite springs and flexibly connected at their upper ends with the said cranks.

9. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame and their other ends connected respectively with one of the axles and with the equalizer bar at one side of its pivotal connection with the frame, the lower leaf spring members diverging outwardly from the sides of the frame, and stabilizer mechanism including an equalizer device connected with the vehicle frame, and a pair of struts flexibly connected at their lower ends respectively with the lower leaf spring member of opposite springs intermediate the ends of said members, and flexibly connected at their upper ends with the equalizer device.

10. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, the upper leaf spring members of the springs extending substantially parallel with the sides of the frame, and the lower leaf spring members diverging outwardly therefrom, and stabilizer mechanism including an equalizer device connected with the vehicle frame, and a pair of struts flexibly connected at their lower ends respectively with the lower leaf spring members of opposite springs, and flexibly connected at their upper ends with the equalizer device.

11. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, the lower leaf spring member of the springs diverging outwardly from the sides of the frame, said lower leaf spring members having a small degree of camber and being substantially flat under normal load, and stabilizer mechanism including an equalizer device connected with the vehicle frame, and a pair of struts flexibly connected at their lower ends respectively with the lower leaf spring members of opposite springs, and flexibly connected at their upper ends with the equalizer device.

12. A vehicle suspension including in combination with a frame and axles therefor, a transversely disposed equalizer member pivotally connected intermediate its ends with the frame, springs at opposite sides of the frame, each spring comprising a pair of leaf springs having their butt ends connected together and pivotally connected to the frame, and their other ends connected respectively with one of the axles and with the equalizer bar at one side of the pivotal connection of the equalizer bar with the frame, stabilizer mechanism including a pair of intermeshing gears mounted for rotation upon the vehicle frame, cranks fixedly connected with said gears, and a pair of struts flexibly connected at their lower ends respectively with opposite springs, and flexibly connected at their upper ends with said cranks, and retarding means operatively connected with one of said gears.

13. A vehicle suspension including in combination with a frame and axles therefor, of a transversely disposed equalizer member pivotally connected intermediate its ends with the frame, springs at opposite sides of the frame, each spring being connected with one of the axles, and with said equalizing member at one side of its pivotal connection, stabilizer mechanism including an equalizing device connected with the vehicle frame, and a pair of struts flexibly connected at their lower ends respectively with opposite springs and flexibly connected at their upper ends with the equalizer device, and a vibration check device operatively connected with the equalizer device and acting through said connection to exert a retarding action during the rebound stroke of the springs.

In testimony whereof I hereunto affix my signature in the presence of two witnesses.

STEPHEN LEONARD CHAUNCEY COLEMAN.

Witnesses:
L. A. JANETT,
HARRIS G. FENETY.